United States Patent [19]

Djiauw

[11] Patent Number: 5,320,899
[45] Date of Patent: Jun. 14, 1994

[54] THERMOPLASTIC BLOCK COPOLYMER FILMS

[75] Inventor: Lie K. Djiauw, Houston, Tex.

[73] Assignee: Shell Oil Company, Houston, Tex.

[21] Appl. No.: 134,498

[22] Filed: Oct. 12, 1993

Related U.S. Application Data

[63] Continuation of Ser. No. 961,242, Oct. 15, 1992, abandoned.

[51] Int. Cl.$^5$ .................... C08L 53/02; C08L 31/04; C08L 25/06
[52] U.S. Cl. ..................... 428/220; 525/93; 525/98
[58] Field of Search ............... 525/93, 98; 428/220

[56] References Cited

U.S. PATENT DOCUMENTS

| | | |
|---|---|---|
| 3,629,387 | 4/1969 | Watanabe et al. |
| 3,865,776 | 2/1975 | Gergen |
| 3,947,536 | 3/1976 | Horiie et al. |
| 3,980,736 | 9/1976 | Agouri et al. |
| 3,994,439 | 11/1976 | Van Breen et al. |
| 4,006,116 | 2/1977 | Dominguez |
| 4,017,436 | 4/1977 | Tabana et al. |
| 4,070,418 | 1/1978 | Harpell |
| 4,082,877 | 4/1978 | Shadle |
| 4,216,131 | 8/1980 | Himes ............ 210/33.6 AQ |
| 4,367,312 | 1/1983 | Bontinck ................ 525/93 |
| 4,377,658 | 3/1983 | Collins ................ 524/425 |
| 4,386,188 | 5/1983 | Grancio et al. |
| 4,457,960 | 7/1984 | Miewsome ............ 428/35 |
| 4,476,180 | 10/1984 | Wnuk |
| 4,565,720 | 1/1986 | Yaeo ............ 428/35 |
| 4,701,367 | 10/1987 | Malhotra |
| 4,977,014 | 12/1990 | Mitchell et al. |
| 5,068,138 | 11/1991 | Mitchell et al. |

FOREIGN PATENT DOCUMENTS

| | | |
|---|---|---|
| 254346 | 1/1988 | European Pat. Off. |
| 1902228 | 4/1969 | Fed. Rep. of Germany |
| 51071-363 | 4/1974 | Japan |
| 5003409 | 1/1980 | Japan |
| 57098-544 | 12/1980 | Japan |
| 58-204037 | 11/1983 | Japan |
| 1221258 | 10/1986 | Japan |
| 1341922 | 12/1973 | United Kingdom |

OTHER PUBLICATIONS

Hawley's Condenced Chemical Dictionary 7th Ed., Van Nostrard Reinhold Co., N.Y., 1987.
"Polymer Blends", Martuscelli, E.; Palumbo, R.; Plenium Press, N.Y. 1980, pp. 319–331.

*Primary Examiner*—James J. Seidleck
*Assistant Examiner*—I. Zewel
*Attorney, Agent, or Firm*—Keith M. Tackett

[57] ABSTRACT

The tensile properties of elastic polymer films which contain thermoplastic block copolymer compositions and ethylene/vinyl acetate copolymers are improved by replacing some of the ethylene/vinyl acetate with a polyolefin having low crystallinity. The increase in tensile strength occurs without significant loss of elasticity and is most significant when the polyolefin is an ultra-low density polyolefin.

5 Claims, No Drawings

THERMOPLASTIC BLOCK COPOLYMER FILMS

This is a continuation of application Ser. No. 07/961,242, filed Oct. 15, 1992 now abandoned.

BACKGROUND OF THE INVENTION

The invention relates to blends of thermoplastic block copolymers, ethylene/vinyl acetate copolymers, and polyolefins. More specifically, the invention relates to films made from the blends.

U.S. Pat. Nos. 4,476,180 and 4,977,014 describes elastomeric films comprising from about 40% to about 80% of a thermoplastic block copolymer composition and from about 15% to about 60% of an ethylene-vinyl acetate copolymer. The '180 patent teaches that films having both good tensile strength and good elasticity must contain ethylene/vinyl acetate copolymers that have a vinyl acetate content between 22% and 33% and have a melt index less than 0.6 as determined by ASTM Method D 1238, Condition B. The '014 patent teaches that addition of small amounts of polystryrene to the blends improves tensile strength without significant reduction in elasticity and that the limits on vinyl acetate content and melt index can be broadened.

SUMMARY OF THE INVENTION

The tensile strength of polymer films containing thermoplastic block copolymers and ethylene/vinyl acetate (EVA) copolymers is surprisingly increased by replacing some of the EVA copolymer with a polyolefin having low crystallinity. Linear-low density polyethylene and ultra-low density polyethylenes having a crystallinity below 60% can improve tensile strength in amounts between 5% and 20% without reducing elasticity of the film.

DETAILED DESCRIPTION OF THE INVENTION

The present invention is an elastomeric polymer film comprising from about 40% to about 80% of a thermoplastic block copolymer composition, from about 5% to about 20% of an ethylene/vinyl acetate (EVA) copolymer, 10 to 45 parts polystyrene per hundred parts of thermoplastic block copolymer, and 5% to 20% of a polyolefin having a crystallinity less than 60%.

The thermoplastic block copolymer compositions employed in the film composition are blends of an oil and a thermoplastic elastomer having at least two monoalkenylarene polymer blocks A and at least one unsaturated conjugated diene polymer block B as described in U.S. Pat. No. 4,977,014 which is incorporated by reference herein. The preferred monoalkenylarene is styrene and the preferred conjugated diene is butadiene.

A most preferred block copolymer composition is KRATON $^R$ D4150 block copolymer crumb which is sold by Shell Chemical Company. These linear styrene-butadiene-styrene block copolymer compositions have a peak molecular weight of 170,000 on a polystyrene scale, contain about 32% polystyrene, and include about one-third oil by weight to improve elasticity. The oiled polymer composition has a low melt index which assists in maintaining a low melt index for the film composition.

The thermoplastic block copolymer compositions are blended with an EVA copolymer as described in U.S. Pat. No. 4,977,014. For the present invention, the EVA may have a vinyl acetate content between 12% and 33% and maintain good elasticity. The melt index of the EVA can vary depending on the melt index of the other components such that the melt index of the film composition is less than 12 as determined by ASTM Method D 1238, Condition E. An EVA with a melt index less than 30 (Condition E) or less than 3 (Condition B) will make stable films when blended with the KRATON $^R$ D4150 block copolymer composition when polystyrene is present as described below.

Suitable EVA copolymers are commercially available from US Industrial Chemicals under the designation UE645 or UE634 (both 28% vinyl acetate), and from DuPont Chemical Company under the designation Elvax 250 (28% vinyl acetate) or Elvax 460 (18% vinyl acetate).

The present invention includes the addition of polystyrene in an amount from 10 to 45 parts per hundred parts of the thermoplastic block copolymer. The polystyrene effectively increases the elasticity of the block copolymer and reduces blocking. The polystyrene also improves melt processing of the film composition and eliminates die build-up experienced for similar films prepared without the polystyrene.

A preferred polystyrene is commercially available from Huntsman Chemical Company under the designation DP-210. This general purpose polystyrene has a molecular weight distribution that is highly compatible with the KRATON $^R$ D4150 block copolymer composition.

The films of the invention further contain 5% to 20% by weight of a polyolefin having a crystallinity less than 60%, preferably a crystallinity from 50% to 58%. Preferred polyolefins include ATTANE ® 4001 polyethylene from Dow Chemical, an ultra-low density polyethylene (density of 0.91) having a crystallinity of about 55%, and DOWLEX ® 2045 polyethylene from Dow Chemical, a linear-low density polyethylene (density of 0.92) having a crystallinity of about 59%. Each polyethylene has a melt index of 1 g/10 min.

The film compositions of the present invention preferably include stabilizers, slip agents, and anti-blocking agents in an amount between 0.1 and 10 parts per hundred parts of the block copolymer. Preferred additives are described in the Examples below.

The elastic film composition of the present invention may be manufactured using polymer blending techniques currently practiced in the art, such as batch and continuous mixing methods employing mixing equipment like Banbury batch mixers, Farrell continuous mixers and twin-screw extruders. Well mixed compositions are obtainable when mixing is carried out at a melt temperature in the range between about 350° F. to about 450° F. Films blown with inadequately mixed compositions usually would show a high intensity of gels or a fish eye appearance as well as a tendency to block.

Extrusion blown films may be prepared from the compositions of this invention using standard equipment, standard techniques and typical conditions. A polyolefin type extruder screw is preferred, but other designs are also acceptable. A die gap of about 5 to about 120 mils is acceptable, a gap of about 10 to about 80 mils is preferred, and a gap of about 20 to about 40 mils is most preferred. Die temperatures of about 340° F. to about 400° F. are acceptable and between about 350° F. and 375° F. are preferred. A blow up ratio of 2 to 1 is preferred. Rapid cooling of the extruder blown film is preferably performed by a dual lip cooling ring. Due to the low modulus of the film produced from the composition of this invention, a rollered collapsing frame is preferred to avoid bubble chatter.

A film which is extrusion blown from the composition of this invention is between about 0.5 and 10 mils in thickness, and is preferably between about 1.0 and about 6 mils in thickness and is most preferably between about 1.0 and 6 mils in thickness.

A 2 mil film can be extrusion blown from the composition of the present invention using a 2.5 inch extruder with a 10 inch die and a 0.030 inch die gap and 20/80/200/80/20 screens. The extrusion can be at a pressure of 2800 psi and at the rate of 70 fpm. A screw speed 30 rpm, a melt temperature of 370° F., and a blow up ratio of 1.8 to 1 are acceptable. The composition of this invention may be extruder blown to a film with a low modulus, and excellent tensile strength and high ultimate elongation in both machine and transverse directions, high blow out ratios, low permanent set and high recoverable energy. This composition is also made of less expensive components than alternative elastomeric film compositions. Films having 100% modulus of less than about 550 psi in both the machine and transverse directions are obtainable, and blow up ratios of up to 2 are obtainable with the composition of this invention. Films made from the composition of this invention have recoverable energy of greater than about 45% and permanent sets of about 18% and less.

EXAMPLES

The following examples illustrate preferred embodiments of the invention in comparison to a similar composition which does not contain a polyolefin having a crystallinity less than 60%. All experiments were conducted with KRATON $^R$ D4150 block copolymer composition. The additive package employed in the following examples includes, based on the block copolymer content, 0.45 phr Irganox 1010 stabilizer sold by Ciba Geigy Corp., 2.25 phr each of Armoslip CP and Armoslip 18 slip agents sold by AKZO Chemicals, Inc., and 1.0 phr Eazeslip 58 fold by Schering Berlin Polymers.

The melt index of the blend compositions was determined according to ASTM Method D-1238, condition B or E as indicated. The ultimate tensile strength and elongation were determined according to ASTM D-882-81 method using an Instron Model 1122 tester. The tensile properties of the film were measured in the direction of extrusion of the film (machine direction, MD); and in the direction perpendicular to the direction of extrusion (transverse direction, TD).

To determine permanent set, a specimen was prepared according to ASTM D-882-81. Test specimens were cut along the direction of extrusion of the film (MD). An Instron Model 1122 tester was used to subject the specimens to maximum extension of 150% strain and then unload at the same rate as the extension until the specimen was in the relaxed state (near zero force). Subsequently another loading cycle was imposed. The length at which the specimen reaches its relaxed state in the unloading cycle was measured and the permanent set was then calculated according to the following equation:

$$\text{Permanent set} = 100\% \times \frac{\text{(relaxed length} - \text{original length)}}{\text{(maximum length} - \text{original length)}}$$

The recoverable energy is the ratio of the energy released during the unloading cycle to the energy stored during the loading cycle.

The blow-out ratio of blown films is calculated as the ratio of the total lay flat width of the blown film to the circumference of the inner circle of the film die.

The Emerdoft tear strength of the films was measured in accordance to ASTM Method D1922.

EXAMPLE A (COMPARATIVE)

A comparative polymer film was prepared from a blend of 150 parts of the thermoplastic block copolymer composition (about 100 parts block copolymer and 50 parts oil) and 45 parts of ELVAX 250 polymer, an EVA copolymer from DuPont Chemical. A processing oil, polystyrene, and the preferred additive package were included as indicated in the Table below. All ingredients were blended with a twin-screw extruder (diameter=0.8 inch, screw length/diameter ratio, L/d,=20:1). The films were obtained by blown film process using a 0.75 inch diameter single screw Brabender extruder equipped with a 2 inch diameter film die and 0.020 inch die gap at 1500 psi. Properties of the resulting film are listed in the Table below for comparison to the properties of the films described in Examples 1–6.

TABLE I

| | Examples | | | | | | |
|---|---|---|---|---|---|---|---|
| | A | 1 | 2 | 3 | 4 | 5 | 6 |
| Component, wt % | | | | | | | |
| KRATON D4150 Composition | 67 | 67 | 67 | 67 | 67 | 62 | 67 |
| Penreco 4434 Oil | 3.1 | 3.1 | 3.1 | 3.1 | 3.1 | 2.9 | 3.1 |
| Polystyrene, DP210$^a$ | 9.4 | 9.4 | 9.4 | 9.4 | 9.4 | 8.7 | 9.4 |
| EVA, Elvax 250$^b$ | 20 | 11 | 9 | 13 | 7 | 10 | 11 |
| ULDPE, Attane 4001$^c$ | — | 9 | 11 | 7 | 13 | 16 | — |
| LLDPE, Dowlex 2045$_d$ | — | — | — | — | — | — | 9 |
| Additives | 0.5 | 0.5 | 0.5 | 0.5 | 0.5 | 0.4 | 0.5 |
| TOTAL | 100 | 100 | 100 | 100 | 100 | 100 | 100 |
| Physical Properties | | | | | | | |
| Tensile strength, psi | | | | | | | |
| MD direction | 1270 | 2230 | 2700 | 2000 | 2830 | 2040 | 1480 |
| TD Direction | 900 | 1920 | 1560 | 1560 | 2710 | 2060 | 1390 |
| Ultimate Elongation, % | | | | | | | |
| MD direction | 970 | 960 | 1005 | 970 | 1010 | 1020 | 1030 |
| TD Direction | 740 | 890 | 800 | 880 | 830 | 820 | 940 |
| Emerdoft tear, gm/mils | 58 | 74 | 73 | 64 | 91 | N/A | 62 |
| Hysteresis test, 150% | | | | | | | |
| Stress @ 150% strain | 330 | 398 | 387 | 340 | 445 | 420 | 480 |
| Recoverable Energy, % | 48.7 | 49.3 | 48.3 | 56.9 | 43.8 | 46 | 51 |
| Permanent set | 10 | 12.5 | 13.5 | 10 | 15 | 16 | 12 |

Notes:
$^a$Huntsman Polystyrene grade DP210
$^b$EVA resin, 28% VA content, MI = 25 (Cond. E), DuPont Chemical
$^c$Ultra-low density PE, density = 0.912, MI = 1 (Cond. E, Film grade resin, Dow Chemical
$^d$Linear-low density PE, density = 0.920, MI = 1 (Cond. E), Dow Chemical

EXAMPLE 1

A polymer film was prepared as described in comparative Example A except that 20 phr of the EVA polymer were substituted with 20 phr of ATTANE 4001 polyolefin. The resulting film surprisingly has substantially increased tensile strength and similar elasticity in comparison to the film of Example A.

EXAMPLE 2

A polymer film was prepared as described in comparative Example A except that 25 phr of the EVA polymer were substituted with 25 phr of ATTANE 4001 polyolefin. The resulting film is similar to the film of Example 1 except that MD tensile strength increased and TD tensile strength decreased.

EXAMPLE 3

A polymer film was prepared as described in comparative Example A except that 15 phr of the EVA polymer were substituted with 15 phr of ATTANE 4001 polyolefin. The resulting film is similar to the film of Example 1 but has slightly lower tensile strength and elasticity.

EXAMPLE 4

A polymer film was prepared as described in comparative Example A except that 30 phr of the EVA polymer were substituted with 30 phr of ATTANE 4001 polyolefin. The resulting film is similar to the film of Example 1 with higher tensile strength and reduced elasticity.

EXAMPLE 5

A polymer film was prepared as described in comparative Example A except that 20 phr of the EVA polymer were substituted with 38 phr of ATTANE 4001 polyolefin. The resulting film is similar to the film of Example 1 except that the additional amounts of the polyolefin raised the compression set of the film.

EXAMPLE 6

A polymer film was prepared as described in Example 1 except that the ATTANE 4001 polyolefin was replaced with an equal amount of DOWLEX 2045 polyethylene. The resulting film had significantly less strength and a lower tear strength in comparison to the film of Example 1.

The examples support a correlation between tensile strength and addition of a polyolefin having low crystallinity. Moreover, comparison of Example 1 to Example 6 demonstrates an unexpected increase in tensile strength resulting from selection of an ultra-low density polyethylene instead of a linear-low density polyolefin.

What is claimed is:

1. A blown polymer film, comprising
   a thickness between about 0.5 and 10 mils;
   about 40% to about 80% of a thermoplastic block copolymer composition containing predominantly a block copolymer of a monoalkenylarene and an unsaturated conjugated diene;
   about 5% to about 20% of an ethylene/vinyl acetate copolymer having a vinyl acetate content between 12% and 33%;
   10 to 45 parts polystyrene per hundred parts of the block copolymer in the block copolymer composition; and
   5% to 20% of a polyolefin having a crystallinity less than 60%.

2. The polymer film of claim 1, wherein the thermoplastic block copolymer composition is a blend of a polystyrene-polybutadiene-polystyrene block copolymer and an oil.

3. The polymer film of claim 2, wherein the polyolefin has a crystallinity from 50% to 58%.

4. The polymer film of claim 3, wherein the vinyl acetate content of the ethylene/vinyl acetate polymer is 28%.

5. The polymer film of claim 1, wherein the film has a tensile strength of at least 2000 psi in the machine direction.

* * * * *